Figure 1:
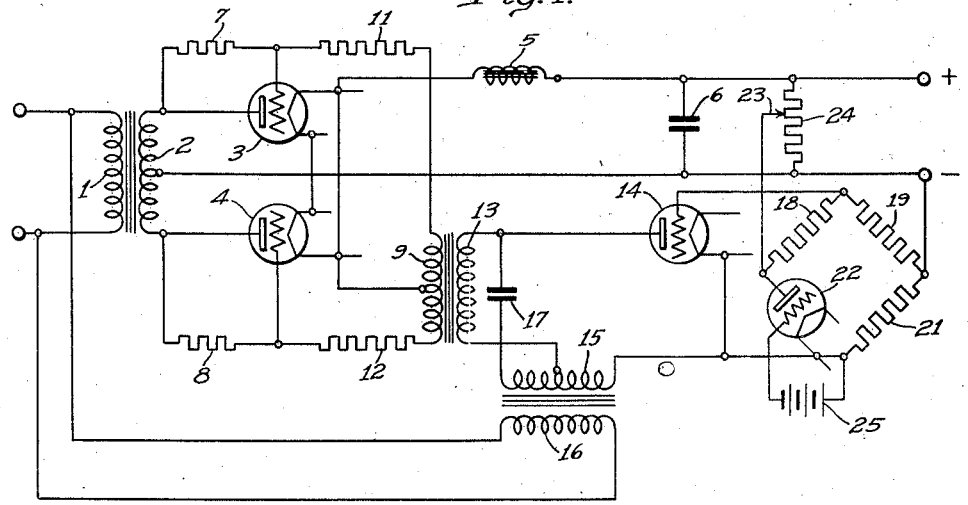

April 6, 1943.    J. A. HUTCHESON ET AL    2,315,619
CONSTANT VOLTAGE RECTIFIER
Filed Oct. 16, 1940

WITNESSES:
C. J. Weller.
Thus. C. Groome

INVENTORS
John A. Hutcheson and
Reuben Lee.
BY
F. W. Lyle.
ATTORNEY

Patented Apr. 6, 1943

2,315,619

UNITED STATES PATENT OFFICE 2,315,619

CONSTANT VOLTAGE RECTIFIER

John A. Hutcheson and Reuben Lee, Catonsville, Md., assignors to Westinghouse Electric & Manufacturing Company, East Pittsburgh, Pa., a corporation of Pennsylvania Application October 16, 1940, Serial No. 361,347

7 Claims. (Cl. 175—363)

Our invention relates to alternating-current rectifiers and, in particular, relates to arrangements for maintaining a substantially constant direct-current output voltage over a wide range of load current.

One object of our invention is to provide an alternating current rectifier with auxiliary circuits adapted to maintain a substantially constant output voltage in spite of wide variations of output current.

Another object of our invention is to provide an alternating-current rectifier of the electrical discharge tube type with control electrodes and energizing circuits therefor which are adapted to prevent the variation of the direct-current output voltage from a predetermined value, notwithstanding variations of load current and of impressed alternating voltage.

Another object of our invention is to provide an alternating-current rectifier with regulating circuits adapted to act substantially instantaneously in preventing variation of its output voltage from a predetermined value.

Figure 2:
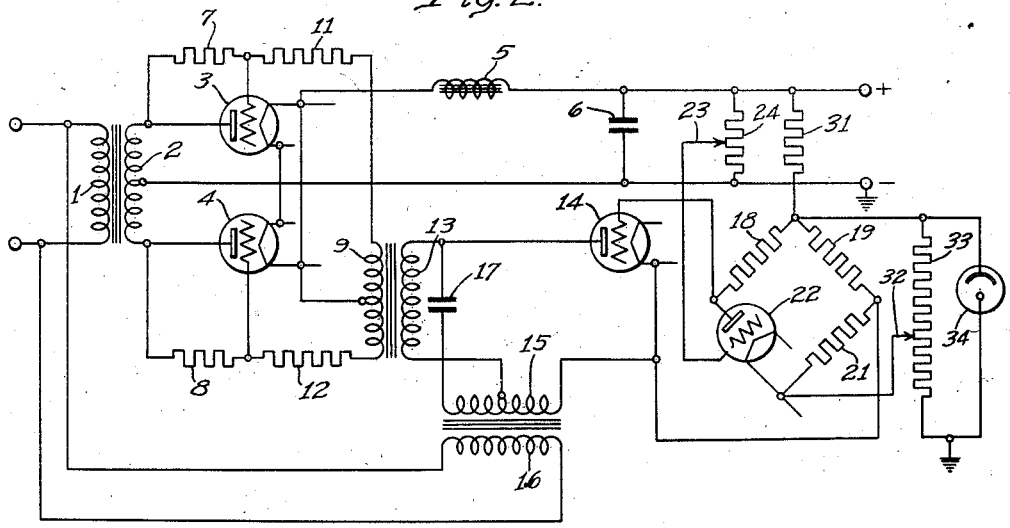

Other objects of our invention will become apparent from reading the following specification taken in connection with the drawing, in which:

Figure 1 is a schematic diagram of one circuit arrangement embodying the principles of our invention; and Fig. 2 is a schematic diagram of another circuit arrangement which is a modification of that shown in Fig. 1, but is adapted to effect similar purposes.

For numerous purposes in the field of electrical engineering, for example, the supplying of plate voltage to electrical discharge tube oscillators and to class "B" audio amplifier tubes, it is desirable to derive power from an alternating-current source, such as a city power line, and to rectify it to produce a source of direct-current voltage of substantially constant value, even in the face of variations of the alternating supply voltage and wide variations in the load current used. Certain expedients known to the prior art for approximating invariability of direct-current output voltage over a wide range of output current, such as the employment of transformers having a low internal impedance and certain uses of reactors, are unsatisfactory because of the large size and consequent expense of such transformers and reactors.

In accordance with our invention, we derive the direct current from the alternating-current supply through a rectifier provided with control electrodes, and so vary the phase and magnitude of the voltage impressed upon these control electrodes as to maintain substantial constancy of the direct-current output voltage, notwithstanding variations of load current and of the alternating supply voltage over considerable ranges.

With the foregoing principles of our invention in mind, Fig. 1 of the drawing shows a transformer primary 1 connected to an ordinary alternating-current supply line, the secondary winding 2 of this transformer having its mid-point connected to the negative lead of the direct-current circuit which it is to supply. Two terminals of the secondary winding 2 are respectively connected to the anodes of a pair of rectifiers 3 and 4, which may be either of the high vacuum or gas-discharge type, of which the cathodes are connected, through a filter comprising reactor 5 and condenser 6, with the positive terminal of the direct-current load line. The connections and circuit elements so far described are conventional ones for rectifier circuits, and no further description of them is believed to be necessary.

The rectifier tubes 3 and 4 are each provided with a control electrode, and these control electrodes are respectively connected to the terminals of secondary winding 2 by resistors 7 and 8. The cathodes of the rectifiers 3 and 4 are connected to the mid-point of a transformer winding 9, the end terminals of which are respectively connected through resistors 11 and 12 to the control electrodes of rectifier tubes 3 and 4. The secondary winding 13, which cooperates with the primary winding 9, has one terminal connected to the anode of a grid-controlled discharge tube 14 which may be of either the high-vacuum or the gas-discharge type. The other terminal of the secondary winding 13 is connected to the mid-point of a transformer secondary winding 15, the primary winding 16 of which is connected across the terminals of primary winding 1. The end terminals of the secondary winding 15 are respectively connected to the cathode of the discharge tube 14 and through a capacitor 17 to the anode of the discharge tube 14.

Three resistors 18, 19 and 21 are interconnected to form three arms of a Wheatstone bridge, the fourth arm of which comprises the anode-to-cathode circuit of a grid-controlled tube 22 which is preferably of the high-vacuum type but may under certain conditions be of the gas-discharge type. The anode of the discharge tube 22 is connected to a variable tap 23 on a resistor 24 which shunts the terminals of the direct-current load circuit. The terminal of the Wheatstone bridge, which is diametrically opposite to the anode of discharge tube 22, is connected to the negative terminal of the direct-current load circuit. The two remaining terminals of the Wheatstone bridge are respectively connected to a control electrode of the discharge tube 14 and to the cathode thereof. A variable bias source 25 is provided by which it is possible to manually adjust the internal impedance of the discharge tube 22 to any desired value.

With normal supply voltage impressed across the terminals of the primary winding 1 and no load current flowing through the direct-current load circuit, the setting of the bias source 25 is adjusted to balance the above-mentioned Wheatstone bridge so that no potential drop is impressed between the control electrode and the cathode of the discharge tube 14. If now even a slight variation, due to change of load current, or change of alternating voltage impressed on primary winding 1, occurs, the control electrode of discharge tube 14 will be made either more positive or more negative, thereby varying the phase and magnitude of the current which is caused by secondary winding 15 to flow through the respective branches of the network comprising secondary winding 13, discharge tube 14, and capacitor 17. The polarity of the secondary winding 9 is originally made such that, when an increase of voltage takes place on the direct-current output circuit, the control electrodes of rectifier tubes 3 and 4 are made less positive during those half cycles of the supply voltage in which their respective anodes are positive. In consequence of this fact, the value of the direct-current output voltage tends to decrease. Conversely, a decrease of the direct-current output voltage so varies the potential of the control electrode of discharge tube 14 that the control electrodes of rectifier tubes 3 and 4 are rendered more positive during those half cycles of the alternating supply voltage in which their respective anodes are positive, thereby tending to increase the direct-current output voltage. The arrangement thus compensates for any tendency of the direct-current output voltage to depart from the value at which it was originally set by adjustment of variable bias-source 25. Because of the amplifying power of the tubes 22 and 14, very slight departures of the direct-current output voltage from the value originally preset cause compensating variations in the output voltage of rectifiers 3 and 4. Since the response of electrical discharge devices to any variation in the voltage of their control electrodes is substantially instantaneous, there is practically no time lag in the regulating action of the system just described.

Fig. 2 of the drawing shows a modification of the invention shown in Fig. 1. Since the circuit elements 1 through 24 are the same, and their connections are the same, as those already described in connection with Fig. 1, no repetition of the description of these elements will be given. Fig. 2 differs from Fig. 1 in that the tap 23 on resistor 24 is connected to the control electrode of tube 22 instead of to its anode. The anode of tube 22 and the diametrically-opposite corner of the Wheatstone bridge comprising elements 18, 19, 21 and 22 are respectively connected to the control electrode and the cathode of discharge tube 14. The other two diametrically-opposite corners of this Wheatstone bridge are respectively connected through a resistor 31 to the positive terminal of the direct-current supply line and to a variable tap 32 on a resistor 33 which is connected between the negative terminal of the direct-current supply line and the end of resistor 31 adjacent the aforesaid Wheatstone bridge. The resistor 33 is shunted by a gas-filled electrical discharge tube 34 which is of a type maintaining a constant terminal voltage over a wide range of current.

Current flow through the resistor 31 from the positive terminal of the direct-current load circuit through the respective branches of the Wheatstone bridge and the portion of resistor 33 below the variable tap 32 causes potential drops along the various arms of the Wheatstone bridge. The regulating action of the discharge device 34 tends to maintain a constant voltage across the terminals of the resistor 33 and hence to maintain the cathode of discharge tube 22 at a constant potential relative to the negative terminal of the supply line. By varying the position of tap 23 on resistor 24 at a time when the supply voltage impressed on the terminals of transformer 1 is normal and the direct-current load is substantially zero, the Wheatstone bridge can be balanced so that substantially no potential difference is impressed between the control electrode and the cathode of tube 14. If now the direct-current voltage decreases, the resistance of discharge device 22 will increase, thereby making the control electrode of discharge tube 14 more positive. As a result, a larger current will flow from secondary winding 15 through discharge tube 14, thereby causing a change in the current flowing through primary winding 13. By properly poling the terminals of secondary winding 9, the voltage induced therein by winding 13 is caused to make the potential of the control electrodes of rectifier tubes 3 and 4 more positive in those half cycles of the supply voltage in which their respective anodes are positive. In consequence, the effective internal impedance of rectifier tubes 3 and 4 is decreased and the value of the direct-current output voltage is restored substantially to its normal value. In most instances, it will be found that the circuit of Fig. 2 produces a more sensitive regulating action than does the circuit illustrated in Fig. 1.

It will be evident to those skilled in the art that by substituting a polyphase secondary winding and corresponding polyphase arrangement of rectifier tubes for the full-wave rectifier comprising secondary winding 2 and tubes 3 and 4, a polyphase rectifier arrangement supplying the direct-current load line will result. In such a case, the secondary winding 15 should be replaced by a winding having as many phases as there are in the polyphase rectifier, each such secondary winding being a replica of winding 15 and being provided with a capacitor analogous to capacitor 17, a load winding analogous to winding 13, and a discharge tube analogous to discharge device 14. The cathodes and control electrodes of all the discharge devices analogous to tube 14 may then be respectively connected in multiple with each other and controlled by a single Wheatstone bridge similar to that described in either Fig. 1 or Fig. 2. Each of the load windings analogous to winding 13 should be provided with a secondary winding analogous to one-half of winding 9, one terminal of this secondary winding being connected to the cathodes of the polyphase rectifier and the other terminal being connected through a pair of resistors analogous to resistors 7 and 11 in Fig. 1 to the control electrode and the anode of the corresponding rectifier phase.

It will likewise be evident to those skilled in the art that the voltage of the control electrode of discharge devices 14 in both Fig. 1 and Fig. 2 may, if desired, be adjusted to a value which is not zero relative to the associated cathode when there is no load current on the direct-current system. In other words, the Wheatstone bridges need not be adjusted to exact balance at no load on the direct-current system, although such an adjustment usually makes the system most sensitive as a compensator of output voltage variations. It will also be evident that the Wheatstone bridge may be replaced by bias resistors connected in series with grid-controlled tubes 22 as a means for impressing voltage on the control electrodes of tubes 14. The tubes 14 are, in fact, merely one arrangement for varying the phase and magnitude of current through the windings 13 when the direct-current output voltage of the system tends to change, and other known systems for varying the phase and magnitude of transformer voltages may be substituted for the arrangements here shown.

Tubes 3 and 4 of different types may be used in the practice of our invention and the connection of the tubes depends on the characteristic of the tubes selected. We have found that the apparatus operates satisfactorily with Westinghouse KU 610 thyratrons as the tubes 3 and 4. The KU 610 tubes require a substantial positive control potential to be rendered conductive. For such tubes the anodes should be connected as shown in Fig. 2. We have also found that often Westinghouse KU 627 tubes may be used in Fig. 2 circuit with advantage. The latter tubes become conductive when the control potential exceeds a negative critical value and for this reason KU 627 tubes should be connected in the Fig. 2 circuit with the anode of the tube 3 connected to the lower terminal of the secondary 2 and the anode of tube 4 connected to the upper terminal of secondary 2.

While we have, in accordance with the patent statutes, described particular embodiments of our invention, it will be evident to those skilled in the art that the broad principles thereof are of wider application and other arrangements for applying these principles will be evident to them.

We claim as our invention:

1. In combination with an alternating-current source, a rectifier, having a control electrode, connected to supply power from said source to a direct-current load circuit, a second source of alternating voltage having the same frequency as said alternating-current source, said second source being connected between the cathode of said rectifier and the anode thereof in series with an impedance, and a tap point on said impedance connected to said control electrode, an electrical discharge device provided with a control electrode and connected to cause variations in the voltage of said second source, a Wheatstone bridge comprising three resistors and a high-vacuum electrical discharge tube having one pair of diametrically-opposite terminals energized by a voltage proportional to that of said direct-current load circuit, and having its other pair of diametrically-opposite terminals connected respectively to the last-mentioned control electrode and to one of the principal electrodes associated therewith.

2. In combination with an alternating-current source, a rectifier having a control electrode connected to supply power from said source to a direct-current load circuit, a second source of alternating voltage having the same frequency as said alternating-current source, said second source being connected between the cathode of said rectifier and the anode thereof in series with an impedance, and a tap point on said impedance connected to said control electrode, an electrical discharge device provided with a control electrode and connected to cause variations in the voltage of said second source, a Wheatstone bridge comprising three resistors and a high-vacuum electrical discharge tube having one pair of diametrically-opposite terminals energized by a voltage proportional to that of said direct-current load circuit and having its other pair of diametrically-opposite terminals connected respectively to the last-mentioned control electrode and to one of the principal electrodes associated therewith, and means to adjust the grid voltage of said high-vacuum tube.

3. In combination with an alternating-current source, a rectifier having a control electrode connected to supply power from said source to a direct-current load circuit, a second source of alternating voltage having the same frequency as said alternating-current source, said second source being connected between the cathode of said rectifier and the anode thereof in series with said rectifier and the anode thereof in series with an impedance, and a tap point on said impedance connected to said control electrode, a phase-splitting network having an electrical discharge device provided with a control electrode in one of its branches arranged to vary the voltage of said second source, and means to impress a voltage which varies with that of said direct-current load circuit upon the last-mentioned control electrode.

4. In combination with an alternating-current source, a rectifier having a control electrode connected to supply power from said source to a direct-current load circuit, a second source of alternating voltage having the same frequency as said alternating-current source said second source being connected between the cathode of said rectifier and the anode thereof in series with an impedance, and a tap point on said impedance connected to said control electrode, a phase-splitting network having an electrical discharge device provided with a control electrode in one of its branches and having one of its branches arranged to vary the voltage of said second source, a Wheatstone bridge comprising three resistors and a high-vacuum electrical discharge tube having one pair of diametrically-opposite terminals energized by a voltage proportional to that of said direct-current load circuit and having its other pair of diametrically-opposite terminals connected respectively to the last-mentioned control electrode and to one of the principal electrodes associated therewith.

5. In combination with an alternating-current source, a rectifier having a control electrode connected to supply power from said source to a direct-current load circuit, a transformer supplied from said alternating-current source, an impedance connected in series with the secondary of said transformer between the anode and cathode of said rectifier, and having a tap point connected to said control electrode, an electrical discharge tube provided with a control electrode and arranged to vary the potential impressed by said transformer, a Wheatstone bridge comprising three resistors and a high-vacuum electrical discharge tube having one pair of diametrically-opposite terminals energized by a voltage proportional to that of said direct-current load circuit and having its other pair of diametrically-opposite terminals connected respectively to the last-mentioned control electrode and to one of the principal electrodes associated therewith.

6. In combination with an alternating-current source, a rectifier having a control electrode connected to supply power from said source to a direct-current load circuit, a transformer, an impedance connected in series with the secondary of said transformer between the anode and cathode of said rectifier, and having a tap point connected to said control electrode, a phase-splitting network having an electrical discharge tube provided with a control electrode in one of its branches and supplied by said source and also having one of its branches connected in the primary of said transformer, and means to impress a voltage varying with that of said direct-current load circuit upon the last-mentioned control electrode.

7. In combination with an alternating-current source, a rectifier having a control electrode connected to supply power from said source to a direct-current load circuit, a transformer, an impedance connected in series with the secondary of said transformer between the anode and cathode of said rectifier, and having a tap point connected to said control electrode, a phase-splitting network having an electrical discharge tube provided with a control electrode in one of its branches and supplied by said source and also having one of its branches connected to said rectifier in series with said impedance, a Wheatstone bridge comprising three resistors and a high-vacuum electrical discharge tube having one pair of diametrically-opposite terminals energized by a voltage proportional to that of said direct-current load circuit and having its other pair of diametrically-opposite terminals connected respectively to the last-mentioned control electrode and to one of the principal electrodes associated therewith.

JOHN A. HUTCHESON.
REUBEN LEE.